May 10, 1960 K. MILLER 2,935,860
TORQUE-CONVERTER SEAL
Filed Jan. 5, 1959
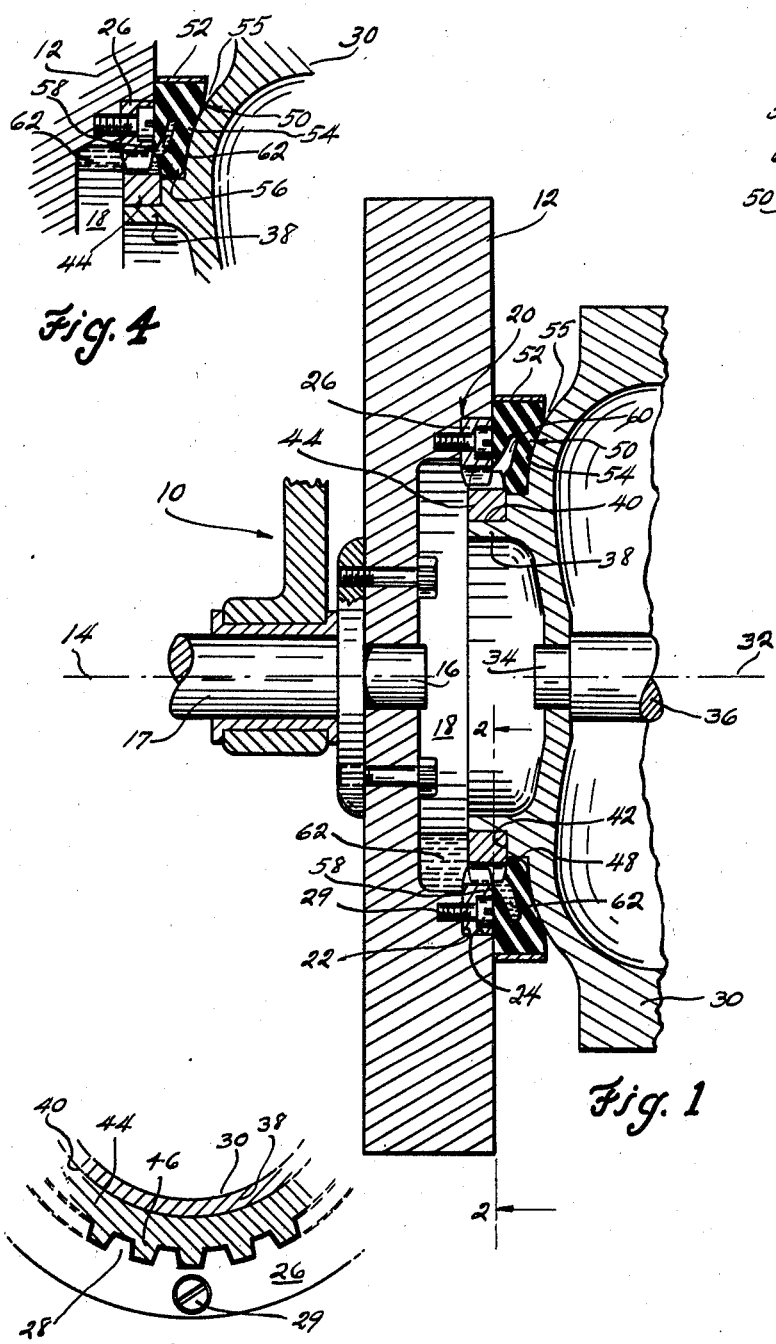
INVENTOR.
KAY MILLER

United States Patent Office 2,935,860
Patented May 10, 1960

2,935,860
TORQUE-CONVERTER SEAL
Kay Miller, Fort Wayne, Ind., assignor to J. I. Case Company, Racine, Wis., a corporation of Wisconsin
Application January 5, 1959, Serial No. 785,076
7 Claims. (Cl. 64—9)

This invention relates to a means for driving a torque converter and especially to an oil seal interposed between the driving and driven members to prevent the loss of oil used for lubricating the coupling means.

One of the conventional methods of driving a torque converter is by flexibly coupling the housing of the latter to the engine flywheel; the latter in this instance being provided with an internal ring gear, and the converter housing having an externally-toothed ring gear. The two gears are mutually engaged in assembly and provide a limited universal-like drive between the members, the latter rotating in independent coaxial journals.

The engine flywheel axis and the converter housing axis are substantially coaxial; however the flywheel and housing are on independent shafts so obviously some misalignment may be present that can cause "fretting" and rapid wear of the teeth of the gears. Lubrication of the surfaces will, to some extent, reduce the tendency to rapid wear. However, sufficient lubrication is difficult to maintain owing to the rapid rotation of the flywheel and converter housing in that, in the absence of a seal, the lubricant escapes between the teeth and is thrown out quickly. In the absence of a seal, the lubricant also escapes by seepage between the teeth at the lower extremity of the unit when the latter is not rotating.

An object of this invention is to provide a seal to prevent the lubricant from being thrown out centrifugally.

Another object is to provide means to prevent loss of lubricant by seepage when the unit is not rotating.

Another object is to provide a seal that maintains sealing contact not withstanding relative "wobbling" between the members being sealed.

Further objects and advantages of this invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention; for instance, to optionally provide the flywheel with an externally-toothed ring gear and the housing with an internal ring gear.

Referring to the drawing:

Fig. 1 is a fragmentary axial cross-section of a converter-drive assembly embracing this invention, and showing a pool of oil at the lower extremity of the assembly when the latter is not rotating.

Fig. 2 is a fragmentary section taken at 2—2 of Fig. 1, showing the spaces between the teeth through which lubricant can escape.

Fig. 3 is a typical radial cross-section of the seal of the invention showing the contour thereof before assembly with the flywheel and housing.

Fig. 4 is a view of a fragment of Fig. 1 and showing the oil during rotation of the assembly, and centrifugally held at the periphery of the recess.

Referring again to the drawing, 10 is a fragmentary portion of an engine having a flywheel 12 which rotates about an axis 14.

Flywheel 12 is positioned on a stud 16 extending from the crankshaft 17 in a conventional manner. A recess 18 is provided concentric with axis 14, and which is of a depth as shown. A second recess 20 is provided having a surface 22 normal to axis 14 and an adjoining cylindrical surface 24 concentric with axis 14. An internal ring gear 26 is provided in this instance having internal teeth or spline portions of a shape similar to gear teeth as shown in Fig. 2. Ring 26 is secured in place in recess 20 in any suitable manner such as by cap screws 29.

Converter housing 30 is of a conventional design suitable for the purpose and rotates on an axis 32 which is substantially in alignment with axis 14. However, it is conceivable that production methods may not succeed in maintaining this relationship and there may be some deviation from the coaxial condition and also some wobble may be present. However, it is one of the objects of this invention to compensate for such misalignment.

Housing 30 is of the conventional design and is mounted on a projection 34 of the usual converter shaft 36. Housing 30 has a portion 38 which is provided outwardly with a cylindrical step 40 and a plane surface 42 normal to axis 32. An external ring gear 44 is provided which is mounted on cylindrical step 40 and against plane surface 42 in any suitable manner such as by cap screws or shrinking the gear in place on the step 40. Ring gear 44 has teeth or splines 46 which mesh with teeth or splines 28 of ring gear 26. A shoulder 48 is provided on housing 30 which is concentric with axis 32 and of a slightly smaller diameter than the root diameter of the external teeth or splines 46 as shown in Figs. 1.

The novel seal 50 of this invention is shown in Fig. 3 as produced and before being assembled on shoulder 48.

Annular seal 50 is composed of oil-resistant synthetic rubber or any other suitable resilient material, and comprises a web portion 54 which is normal to the axis 32 and of a suitable thickness. A bead portion 56 is provided for the purpose of strengthening the inner edge of the seal where it contacts portion 48 of housing 30, the contact being intended to form a seal against the seepage of lubricant. Seal 50 is provided with a feathered lip portion 58 having a contour as shown. Intermediate the feathered portion 58 and web 54 is provided an annular recess 60 which permits the necessary flexibility of portion 58 in assembly, and also provides a chamber where pressure is applied in the direction of web 54 and lip 58 when the unit shown in Fig. 1 is rotating.

When assembling converter drive housing 30 with flywheel 12 a quantity of lubricant 62 is placed in the recess 18. It will be apparent that the lower portion of recess 18 functions as a rservoir for the lubricant when the unit is not rotating. Prior to inserting ring gear 44 in mesh with ring gear 26, sealing ring 50 is placed over portion 48 and bead 56 contacts the latter in a lubricant-sealing relationship. It will also be evident that the portion 54 takes the shape conforming to the housing 30 to provide an additional sealing surface as at 55. It will be clear when housing 30 and flywheel 12 are assembled that feather edge 58 of seal 50 will be forced axially toward web 54 as shown in Fig. 1. In this position there will be appreciable pressure between edge 58 and the face of gear 26 thus providing an effective oil seal.

It is within the purview of this invention to provide the annular reservoir in the torque-converter rather than the flywheel if so desired as an alternative to that shown on the drawing.

Means is necessary to position housing 30 and flywheel 12 in an axial direction relative to each other in order to compress seal 50 a proper amount. However, this is a matter of mechanical skill, is conventional and will not be further described.

Referring to Fig. 1, it will be seen that lubricant 62 will find its way between teeth or splines 28 and 46 by gravity, and form a pool at the lower portion of the seal 50 and the recess 18 when the unit is at rest. It is also clear that when the unit is rotating at its operating speed the lubricant 62 will be forced into portion 60 under pressure as shown in Fig. 4, and which action tends to press feather lip 58 tightly against the face of gear 26.

It is a novel feature of this sealing ring that it will seal against lubrication leakage when there is a condition of relative eccentricity between housing 30 and flywheel 12, and also if there is wobble between housing 30 and flywheel 12 relative to each other. Feather edge 58 will maintain an effective oil seal by flexing and maintaining constant contact with gear 26 under the above conditions.

In order to prevent leakage or creeping of lubricant along the metal-to-metal surfaces 22, 24, and 54, a gasket cement of a suitable type is applied in assembly of these various components.

In assembly, a retaining ring 52 of metal in this instance, is provided and which is a slide fit over sealing ring 50. When the unit is being finally assembled ring 52 abuts flywheel 12 as shown in Figs. 1 and 4. The primary purpose of ring 52 is to confine sealing ring 50 against distortion by centrifugal force which could otherwise impair the sealing effect.

Having now described my invention and in what manner the same may be used, what I claim as new and desire to protect by Letters Patent of the United States is:

1. In a transmission mechanism having a flywheel, and a torque converter housing, said flywheel and housing having individual shafts, said shafts rotating about a common axis, said flywheel having a plane face normal to said axis facing said housing, said housing having a toroid surface facing said flywheel, in combination, an internal ring gear inserted in, and flush with said face, said housing having an external ring gear drivingly engaging said internal ring gear, said flywheel being provided with an annular recess behind said internal ring gear to serve as an oil reservoir, said housing being provided with a shoulder intermediate said external ring gear and said toroid surface, a resilient sealing ring positioned on said shoulder and provided with a web in contact with said toroid surface, and having an annular recess defining a lip portion in resilient contact with said face, and a metal cylindrical retaining ring embracing the outer circumference of said sealing ring.

2. In a transmission mechanism having a flywheel, and a torque converter housing, said flywheel and housing having individual shafts, said shafts rotating about a common axis, said flywheel having a face normal to said axis, facing said housing, said housing having a toroid surface facing said flywheel, in combination, a first ring gear inserted in said face, a second ring gear on said housing drivingly engaging said first ring gear, said flywheel being provided with an annular recess behind said first ring gear to serve as an oil reservoir, said housing being provided with a shoulder intermediate said second ring gear and said toroid surface, a resilient sealing ring positioned on said shoulder and provided with a web in contact with said toroid surface, and having an annular recess defining a lip portion in resilient contact with said face, and a metal retaining ring embracing the outer circumference of said sealing ring.

3. In a transmission mechanism having a flywheel, and a torque converter housing, said flywheel and housing rotating about a common axis, said flywheel having a face normal to said axis and facing said housing, said housing having a surface of revolution facing said flywheel, in combination, a first drive member inserted in and flush with said face, said housing having a second drive member drivingly engaging said first drive member, said flywheel being provided with an annular recess behind said first drive member to serve as an oil reservoir, said housing being provided with an annular shoulder intermediate said second drive member and said surface of revolution, a resilient sealing ring positioned on said annular shoulder and provided with a web in contact with said surface, and having an annular recess defining a lip portion in resilient contact with said face, and a retaining ring embracing the outer circumference of said sealing ring.

4. A seal, for a transmission mechanism having a driving member, and a torque-converter housing, said driving member and housing rotating about a common axis, said driving member having a face normal to said axis facing said housing, said housing having a surface of revolution facing said driving member, in combination, an annular recess in said face, a first serrated power transmitting means in said recess, said housing having a second serrated power transmitting means drivingly engaging said first serrated power transmitting means, said housing being provided with an annular shoulder intermediate said second serrated power transmitting means and said surface, said seal comprising a resilient annular sealing ring positioned on said shoulder and provided with a web in contact with said surface, and a yieldable lip in contact with said face, said ring being provided with an annular chamber intermediate said web and said lip, and a metal retaining ring surrounding the periphery of said sealing ring.

5. A seal, for a transmission mechanism having a driving member and a driven member, said members rotating about a common axis, said driving member having a face normal to said axis and facing said driven member, said driven member having a surface opposed to said face, said drive and driven members having affixed thereto interengaging serrated power-transmitting means, one of said members being provided with an annular recess adjacent said power transmitting means to serve as an oil reservoir, said driven member being provided with a shoulder, an annular resilient sealing member positioned on said shoulder and provided with a web in contact with said surface, and having an annular recess defining a lip portion in resilient contact with said face, and a retaining ring embracing the outer circumference of said sealing member.

6. A seal, for a transmission mechanism having a driving member and a driven member, said members rotating about a common axis, said driving member having a face normal to said axis and facing said driven member, said driven member having a surface opposed to said face, said drive and driven members having affixed thereto interengaging serrated power-transmitting means, one of said members being provided with an annular recess adjacent said power transmitting means to serve as an oil reservoir, said driven member being provided with an annular shoulder and an annular resilient sealing member positioned on said shoulder and provided with a web in contact with said surface and having an annular recess defining a lip portion in resilient contact with said face.

7. A seal for a transmission mechanism having a driving member and a driven member, said members rotating about a common axis and having spaced, mutually-opposed substantially radial surfaces, said members having interengaging flexible power transmitting means, one of said members being provided with an annular recess adjacent said power-transmitting means to serve as a lubrication reservoir, one of said members being provided with an annular shoulder, an annular resilient sealing member positioned on said shoulder and having a web in contact with one of said surfaces and a recess defining a lip in contact with the other of said surfaces.

References Cited in the file of this patent

UNITED STATES PATENTS

| 1,634,499 | Holdsworth | July 5, 1927 |
| 1,769,158 | Oechsle | July 1, 1930 |
| 2,035,171 | Loewus | Mar. 24, 1936 |

FOREIGN PATENTS

| 759,920 | France | Feb. 3, 1934 |